United States Patent Office 3,501,442
Patented Mar. 17, 1970

3,501,442

POLYMERIZATION OF LACTAMS IN THE PRESENCE OF AN ORGANIC OXY-ACID OF PHOSPHORUS

Harold George Burrows and Stephen John Hepworth, Manchester, England, assignors to Imperial Chemical Industries Limited, London, England, a corporation of Great Britain No Drawing. Filed June 15, 1966, Ser. No. 557,623
Claims priority, application Great Britain, June 23, 1965, 26,596/65
Int. Cl. C08g *20/10, 20/12*
U.S. Cl. 260—78 8 Claims

ABSTRACT OF THE DISCLOSURE

A method for producing an improved polyamide from a lactam and the product produced thereby, whereby the polyamide is readily produced at higher molecular weights and whiter colors than previously known polymerizations. The process is effective by the addition of an effective amount of an organic phosphonic acid to the polymerization mixture and effecting the polymerization in the presence of said acid.

The produced polyamides are particularly useful for extrusion into shaped articles, particularly fibers.

This invention relates to a process for the manufacture of polyamides.

According to the invention there is provided a process for the manufacture of polyamides which comprises polymerising a lactam having a ring of from 7 to 13 atoms in the presence of an organic oxy-acid of phosphorus of the formula:

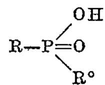

wherein R is a monovalent organic radical, and R′ is a hydrogen atom, a hydroxy group or a monovalent organic radical.

The process of the invention can be conveniently carried out by heating the lactam, or a mixture of such lactams, and the said oxy-acid together, preferably at a temperature between 200° and 300° C., until the required degree of polymerisation is obtained. The reaction is preferably carried out in the absence of air, for example in the presence of an inert gas such as nitrogen. At the conclusion of the process the resulting polyamide is discharged from the autoclave, for example by extrusion, and the ribbon of polyamide cooled, and cut into chips or other form.

If desired, the process can be carried out in the presence of water or an inert organic liquid such as benzene.

As examples of lactams which can be used in the process there may be mentioned caprolactam, capryllactam, enantholactam and above all dodecanolactam.

The monovalent organic radicals represented by R and R′, which are attached to the phosphorus atom through a carbon atom present in said radicals, are preferably alkyl radicals, in particular lower alkyl radicals such as methyl, ethyl, propyl and butyl radicals, cycloalkyl radicals such as the cyclohexyl radical, aralkyl and aralkenyl radicals such as benzyl, $\beta$-phenylethyl and $\beta$-phenylvinyl radicals, and aryl radicals in particular monocyclic aryl radicals such as phenyl and tolyl radicals which may contain substituents such as chlorine atoms.

As specific examples of the said organic oxy-acids of phosphorus there may be mentioned methylphosphonic acid, ethylphosphonic acid, n-propylphosphonic acid, n-butylphosphonic acid, cyclohexylphosphonic acid, benzylphosphonic acid, phenylphosphonic acid, p-chlorophenylphosphonic acid, phenylphosphinic acid, methylphospinic acid, butylphosphinic acid, dimethylphosphinic acid and phenylmethylphosphinic acid.

It is however preferred that the said organic oxy-acid of phosphorus is an acid of the formula

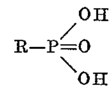

The quantity of the said acid which is used in the process of the invention is preferably between 0.25 and 2.0 molar percent based on the molecular weight of the lactam. The said acid can be added at any stage of the polymerisation of the lactam, but is preferably added at the stage of charging the lactam to the reaction vessel. If desired the acids can be used in the form of their salts with weak volatile bases, such as the ammonium salt of the acids.

If desired other ingredients which are commonly added during the formation of polyamides can also be added to the process of the present invention. As examples of such ingredients there may be mentioned delustrants such as titanium dioxide, fillers such as glass and mica, heat stabilisers such as copper salts and halides, light stabilisers such as manganese salts, and molecular weight regulators such as acetic acid.

The process of the invention results in the production of polyamides which are of much higher molecular weight and are whiter in colour than those obtained by carrying out the polymerisation of the lactams in the absence of the said oxy-acids of phosphorus, and this is of particular importance as it enables polyamides of higher molecular weight to be more readily obtained without the necessity of using long reaction times at elevated temperatures which is liable to cause degradation of the polyamides. The polyamides obtained by the process of the invention are valuable for use in the production of moulded or extruded articles.

It is also found that fibres prepared from the polyamides of the invention have a much higher affinity for acid dyestuffs thus enabling deeper shades to be obtained from such dyestuffs.

The polyamides produced by the process of the invention consist of chains of recurring —NHCO— groups separated from each other by from 5 to 11 carbon atoms and contain an oganic oxy-acid of phosphorus as hereinbefore defined.

The invention is illustrated but not limited by the following examples in which the parts are by weight.

EXAMPLE 1

A mixture of 50 parts of dodecanolactam, 0.8 part of cyclohexylphosphonic acid and 10 parts of water is heated for 5 hours at 262° C. under nitrogen at atmospheric pressure.

The resulting polyamide has a softening point of 176° C., and a melt viscosity at 190° of 15,000 poises. The methanol extractable portion of the polyamide is less than 2%.

EXAMPLE 2

A mixture of 50 parts of dodecanolactam, 0.5 part of cyclohexylphosphonic acid and 40 parts of benzene is heated for 2 hours at 282° C. under nitrogen at atmospheric pressure, whereby a hard white polyamide is obtained. The methanol extractable portion of the polyamide is less than 2%.

In the following table the quantities of lactams listed in the second column of the table were polymerized in the presence of the quantities of the organic oxy-acids of phosphorus listed in the third column of the table and the media listed in the fourth column of the table for the times and temperatures listed in the fifth column of the table. In all these examples hard white polyamides were obtained.

| Example | Lactam | Organic oxy-acid of phosphorus | Media | Reaction conditions |
|---|---|---|---|---|
| 3 | 50 parts of dodecanolactams | 0.5 part of methylphosphonic acid | Benzene (40 parts) | 4 hours at 282° C. |
| 4 | do | 0.5 part of β-phenylvinylphosphonic acid | do | 6 hours at 282° C. |
| 5 | do | 0.5 part of phenylphosphonic acid | do | 4 hours at 282° C. |
| 6 | do | 0.8 part of 4-chlorophenyl cyclohexyl-phosphinic acid. | do | 2 hours at 282° C. |
| 7 | do | 0.5 part of 4-chlorophenylphosphonic acid | do | 1½ hours at 282° C. |
| 8 | 70 parts of capryllactam | 0.7 part of p-tolylphosphonic acid | Water (1 part) | 4½ hours at 250° C. |
| 9 | do | 0.7 part of phenylphosphonic acid | do | Do. |
| 10 | 56 parts of caprolactam | 0.8 part of cyclohexylphosphonic acid | Water (10 parts) | 10 hours at 225° C. |
| 11 | do | 0.6 part of cyclohexylphosphonic acid | do | 6 hours at 230° C. |

NOTE.—The polyamide of Example 11 has a relative viscosity of 30.7 (8.4% solution in 90% formic acid at 25° C.) and a methanol extractable portion of 9%.

We claim:

1. A process for the production of polylactams which comprises polymerizing at a temperature of 200 to 300 degrees centigrade a lactam having a ring of from 6 to 12 carbon atoms in the presence of about 0.25 to 2.0 molar percent of an organic oxyacid of phosphorus having the formula:

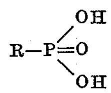

wherein R is a monovalent organic radical selected from the group consisting of lower alkyl, cyclohexyl, benzyl, β-phenylethyl, β-phenylvinyl and monocyclic aryl radicals.

2. Process as claimed in claim 1 wherein the lactam is dodecanolactam.

3. Process as claimed in claim 1 wherein the acid is a lower alkylphosphonic acid.

4. Process as claimed in claim 1 wherein the acid is cyclohexylphosphonic acid.

5. Process as claimed in claim 1 wherein the acid is a monocyclic arylphosphonic acid.

6. The process of claim 1 wherein the lactam is caprolactam.

7. The process of claim 1 wherein the acid is methylphosphonic acid.

8. The process of claim 1 wherein the acid is phenylphosphonic acid.

References Cited

UNITED STATES PATENTS

| | | | |
|---|---|---|---|
| 2,510,777 | 6/1950 | Gray | 260—78 |
| 3,216,976 | 11/1965 | Schwartz et al. | 260—78 |
| 3,235,534 | 2/1966 | Brinkman et al. | 260—78 |
| 3,321,447 | 5/1967 | Kunde et al. | 260—78 |
| 3,365,428 | 1/1968 | Wujciak | 260—78 |
| 3,376,258 | 4/1968 | Gysling et al. | 260—78 |

HAROLD D. ANDERSON, Primary Examiner

U.S. Cl. X.R.

260—45.75